United States Patent Office 2,714,053
Patented July 26, 1955

2,714,053

PROCESS FOR THE RECOVERY OF CRYOLITE FROM THE CARBON BOTTOMS OF FUSION ELECTROLYSIS CELLS

Otto Albert, Braunau (Inn), and Herbert Mader, Ach, Austria, assignors to Vereinigte Aluminium-Werke Aktiengesellschaft, Oeffentliche Verwaltung der Betriebe Braunau am Inn und Unterlaussa, Braunau, Austria No Drawing. Application November 23, 1953, Serial No. 393,936

Claims priority, application Austria November 26, 1952

3 Claims. (Cl. 23—88)

As is known, the carbon lining of the bottom of fusion electrolysis cells containing carbon and cryolite may, after its removal from worn-out bottoms, serve for the recovery of cryolite by finely grinding the carbon lumps in the presence of water and the subsequent addition of a caustic alkaline material, such e. g. as sodium hydroxide, to the wet mixture. This mixture is heated to its boiling point, preferably to 100° C., and the lye resulting from this treatment is filtered, thereby leaving behind the carbon and other insoluble constituents. The dissolve cryolite is precipitated by introducing into the liquid, raised to a temperature of 60 to 100° C., $CO_2$ or alkali metal bicarbonate, e. g. sodium bicarbonate.

It has been found, however, that the precipitation product obtained as described in the preceding paragraph is, even when dried, unsuitable—because of its high hydrate content—for direct introduction into fusion electrolysis cells.

A primary object of the present invention is to obviate the aforesaid defect and to make possible the production of a precipitation product which can be directly introduced into fusion electrolysis cells.

This object is realized according to the present invention by the expedient of adding an excess of fluorine ions to the liquid resulting from the above-described lixiviation of the carbon linings of fusion electrolysis cells, prior to the precipitation of the cryolite. It appears that, heretofore, the said liquid has contained more aluminum than is involved in the conversion of the contained fluorine into cryolite. Consequently, when such liquid was treated with $CO_2$ or sodium bicarbonate, the precipitated product contained not only cryolite but also basic aluminum carbonates.

The fluorine ions may be added in the form of any suitable solution, as for example an aqueous solution of an alkali metal fluoride, advantageously sodium fluoride. It has been found to be economically advantageous to add the said fluorine ions in the form of the washing liquor obtained from the purification of the waste gases from the electrolysis cells. These waste gases contain fluorine in the form of inorganic and/or organic compounds which are taken up by an appropriate wash liquid, in such for example as a 4 per cent by weight aqueous solution of an alkali metal carbonate.

In order to assure complete precipitation of the aluminum in the liquid derived from the aforesaid lixiviation of the carbon linings, it is preferred according to the present invention that the liquid subjected to the precipitant of cryolite contains fluorine ions in an excess of about 30% by weight beyond that which corresponds to the stoichiometric ratio between aluminum and fluorine (for cryolite).

While the liquid (containing e. g. 4.5 per cent by weight alkali metal carbonate) after the precipitation of the cryolite is recycled into the gas washing plant and may again be used as carrier of fluorine ions to be added to the liquid derived from the lixiviation of bottom carbon, the filtered residue of the bottom carbon after washing and drying may be used for the construction of new bottoms. It is also advantageous to use it as fuel, either in dust or briquetted form.

The fluorine ions which remain within the final reaction lye and result from the surplus necessary for the cryolite precipitation, as described above, do not represent a loss since these, as mentioned above, are recycled into the gas washing plant.

The following working examples illustrate but are not intended to be limitative of the invention.

15 tons of material from bottoms of aluminum electrolysis cells are ground to a particle size of 0.09 mm. and placed into an agitator vessel containing 45 cubic meters of a 4 per cent by weight aqueous solution of sodium hydroxide, and then the resulting mixture is thoroughly agitated for 12 hours at a temperature of 25° C., the purpose being the lixiviation of the cryolite and sodium aluminates from the bottom carbon. Then the mixture consisting of lixiviation liquid and lixiviated bottom carbon is filtered on a suction cell filter during which time the filter residue on the filter is washed in the conventional manner with hot water (60° C.). The resulting filtrate consists of an aqueous solution of sodium fluoride and sodium aluminate, and contains 12 grams per liter of fluorine ions and 10 grams per liter of aluminum ions. To 1 liter of this lixiviation liquid are added 3 liters of washing lye as results from the purification of the waste gases from the electrolysis cells (by sodium carbonate); this washing lye contains 30 grams per liter of NaF. Then with continuous stirring at a temperature of 25° C. sodium bicarbonate in powder form is added until a pH of 11.5 is attained. This is followed by further stirring the reaction mixture for another 12 hours, and then is thickened by sedimentation, and the sedimented sludge is subjected to a filtration on suction cell filter. The resulting filter residue is dried at a temperature of 400–500° C. on a drying apparatus. The dry product without further treatment may again be introduced into the aluminum electrolysis cells. This dry product contains 93 per cent of $Na_3AlF_6$ and its weight of 3.3 tons represents 22 per cent of the initial bottom carbon subjected to this process.

Having thus disclosed the invention, what is claimed is:

1. In a process for recovering cryolite from the carbon bottoms of fusion electrolysis cells by treating the ground bottom carbon with aqueous alkali metal hydroxide solution, filtering off the insoluble matter from the liquid, and precipitating the cryolite from the liquid by the introduction of a member selected from the group consisting of carbon dioxide and alkali metal bicarbonate, the step of adding fluorine ions to the liquid prior to the precipitation step in an excess of at least 30% by weight beyond that which corresponds to the stoichiometric ratio between aluminum and fluorine in cryolite.

2. A process as in claim 1 wherein the fluorine ions are added in the form of the washing lye derived from the purification of the waste gases drawn from the electrolysis cells.

3. A process as in claim 2 wherein the final liquid after the extraction of cryolite is recycled into the gas washing plant.

References Cited in the file of this patent

UNITED STATES PATENTS

| 1,871,723 | Morrow | Aug. 16, 1932 |
| 2,186,433 | Von Schwemmer | Jan. 9, 1940 |
| 2,210,594 | Morrow | Aug. 6, 1940 |

FOREIGN PATENTS

| 487,021 | Great Britain | June 14, 1938 |